(12) United States Patent
Hall et al.

(10) Patent No.: US 7,019,651 B2
(45) Date of Patent: Mar. 28, 2006

(54) EAS AND RFID SYSTEMS INCORPORATING FIELD CANCELING CORE ANTENNAS

(75) Inventors: Stewart E. Hall, Wellington, FL (US);
Brent F. Balch, Fort Lauderdale, FL (US); Richard L. Copeland, Lake Worth, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 163 days.

(21) Appl. No.: 10/847,752

(22) Filed: May 18, 2004

(65) Prior Publication Data

US 2004/0252026 A1 Dec. 16, 2004

Related U.S. Application Data

(60) Provisional application No. 60/478,942, filed on Jun. 16, 2003.

(51) Int. Cl.
*G08B 13/14* (2006.01)
(52) U.S. Cl. .................. 340/572.7; 343/787
(58) Field of Classification Search ............ 340/572.7; 235/435, 439, 440, 449, 450; 343/741, 742, 343/788, 787
See application file for complete search history.

(56) References Cited

U.S. PATENT DOCUMENTS

| | | | | |
|---|---|---|---|---|
| 4,243,980 A | * | 1/1981 | Lichtblau | 340/572.7 |
| 5,061,941 A | * | 10/1991 | Lizzi et al. | 343/742 |
| 5,459,451 A | * | 10/1995 | Crossfield et al. | 340/572.7 |
| 6,011,474 A | * | 1/2000 | Coffey et al. | 340/572.3 |
| 6,060,988 A | * | 5/2000 | Copeland et al. | 340/572.1 |
| 6,064,308 A | * | 5/2000 | Janning et al. | 340/573.3 |
| 6,504,513 B1 | * | 1/2003 | Tryer et al. | 343/742 |
| 6,870,507 B1 | * | 3/2005 | Anguera Pros et al. | 343/700 MS |
| 6,930,646 B1 | * | 8/2005 | Yahata et al. | 343/718 |
| 6,947,004 B1 | * | 9/2005 | Mejia et al. | 343/787 |

* cited by examiner

*Primary Examiner*—John Tweel, Jr.

(57) ABSTRACT

An EAS or RFID system including first and second core antenna systems. The first and second antenna systems establish magnetic fields having opposite directions and are positioned so that the fields at least partially cancel outside of an interrogation zone for detecting an EAS or RFID tag. There is also provided an EAS or RFID wherein the magnetic field direction established by a core antenna is varied at certain time intervals to minimize the effects of null zones in the interrogation zone.

34 Claims, 12 Drawing Sheets

EAS AND RFID SYSTEMS INCORPORATING FIELD CANCELING CORE ANTENNAS

CROSS-REFERENCE TO RELATED APPLICATIONS

This application claims the benefit of U.S. Provisional Application Ser. No. 60/478,942, filed Jun. 16, 2003, the teachings of which are incorporated herein by reference.

FIELD OF THE INVENTION

The present invention relates to electronic article surveillance (EAS) and radio frequency identification (RFID) systems, and, in particular, EAS and RFID systems incorporating magnetic core antennas.

BACKGROUND

EAS and RFID systems are typically utilized to protect and track assets. In an EAS system, an interrogation zone may be established at the perimeter, e.g. at an exit area, of a protected area such as a retail store. The interrogation zone is established by an antenna or antennas positioned adjacent to the interrogation zone. The antenna(s) establish an electromagnetic field of sufficient strength and uniformity within the interrogation zone. EAS markers are attached to each asset to be protected. When an article is properly purchased or otherwise authorized for removal from the protected area, the EAS marker is either removed or deactivated.

If the marker is not removed or deactivated, the electromagnetic field causes a response from the EAS marker in the interrogation zone. An antenna acting as a receiver detects the EAS marker's response indicating an active marker is in the interrogation zone. An associated controller provides an indication of this condition, e.g., an audio alarm, such that appropriate action can be taken to prevent unauthorized removal of the item.

An RFID system utilizes an RFID marker to track articles for various purposes such as inventory. The RFID marker stores data associated with the article. An RFID reader may scan for RFID markers by transmitting an interrogation signal at a known frequency. RFID markers may respond to the interrogation signal with a response signal containing, for example, data associated with the article or an RFID marker ID. The RFID reader detects the response signal and decodes the data or the RFID marker ID. The RFID reader may be a handheld reader, or a fixed reader by which items carrying an RFID marker pass. A fixed reader may be configured as an antenna located in a pedestal similar to an EAS system.

It is advantageous for both EAS and RFID systems to have a sufficiently strong and uniform magnetic field within the interrogation zone in order to provide for reliable marker detection. However, if the magnetic field radiates at significant strength levels beyond the interrogation zone, problems can occur. For instance, the associated EAS or RFID system may not comply with regulatory requirements that restrict the level of the magnetic field at various distances from the antenna(s).

In order to establish a strong field near the antenna, i.e. in the interrogation zone, and a diminished field far away from the antenna to comply with regulatory requirements, field canceling arrangements for loop antennas have been developed. Such a field canceling arrangement may include a nested loop configuration where an inner loop antenna is nested within an outer loop antenna in a common plane. The outer loop antenna and inner loop antenna are designed so that the magnetic fields from each of the loops are equal and opposite at a distance far away from the antenna causing the fields to cancel.

However, the configurations utilized for field canceling with loop antennas do not directly translate to magnetic core antennas. This is due to the differences in the construction of the antennas, the field concentrating characteristics of high permeability core materials, and the major differences in the shape and gradients of the resulting magnetic field. In addition, the nested loop construction for loop antennas is simply not possible with magnetic core antennas.

In addition, it is desirable to have the magnetic field sufficiently strong across the entire plane of the interrogation zone in many orientations since markers are often directionally more sensitive in one orientation when aligned with the orientation of the magnetic field. Areas of a weak magnetic field in the interrogation zone may develop in various orientations in certain regions based on the particulars of the system. Such areas are referred to herein as "null zones" because the magnetic fields emanating from the antennas cancel to form a "null" in the magnetic field. Such null zones degrade the performance of the system as a marker passing through a null zone in a certain orientation may not be properly detected.

Magnetic core antennas contribute to the presence of null zones since they establish fields having regions where the magnetic field vectors are perpendicular to the orientation of the marker. In addition, in systems utilizing multiple core antennas, there are also certain regions where the magnetic field vectors from adjacent core antennas cancel one another.

Accordingly, there is a need for a field canceling arrangement utilizing magnetic core antennas. There is also a need in the art for an apparatus and method of reducing null zones created in a magnetic core antenna system.

SUMMARY OF THE INVENTION

According to one aspect of the invention, there is provided an EAS or RFID system including first and second core antenna systems. The first core antenna system is configured to establish a first magnetic field having a first direction. The second core antenna system is configured to establish a second magnetic field having a second direction opposite from the first direction. The first and second magnetic fields at least partially cancel each other at a distance outside of a predetermined interrogation zone for detecting an EAS or RFID tag.

According to another aspect of the invention, there is provided a method of establishing an interrogation zone in an EAS or RFID system with reduced magnetic field strength outside of the interrogation zone. The method includes: exciting a first core antenna to provide a first magnetic field in a first direction; and exciting a second core antenna to provide a second magnetic field in a second direction, wherein at a position outside of the interrogation zone the first magnetic field and the second magnetic field at least partially cancel.

According to another aspect of the invention, there is provided an EAS or RFID system including at least one controller configured for providing a first excitation signal during a first time interval and a second excitation signal during a second time interval. At least one core antenna is configured to produce a first magnetic field in a first direction during the first time interval and to produce a second magnetic field in a second direction opposite from the first direction during the second time interval. In one embodiment, first and second antennas producing opposite magnetic fields in the respective time intervals may be provided.

According to another aspect of the invention, there is provided a method of establishing an interrogation zone in an EAS or RFID system. The method includes: exciting a first core antenna to provide a first magnetic field in a first direction during a first time interval; and exciting the first core antenna to provide a second magnetic field in a second direction during a second time interval, wherein the second direction is substantially opposite the first direction.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

For simplicity and ease of explanation, the present invention will be described herein in connection with various exemplary embodiments thereof associated with EAS systems. A core antenna system consistent with the present invention may, however, be used in connection with an RFID or other system. It is to be understood, therefore, that the embodiments described herein are presented by way of illustration, not of limitation.

Figure 1:
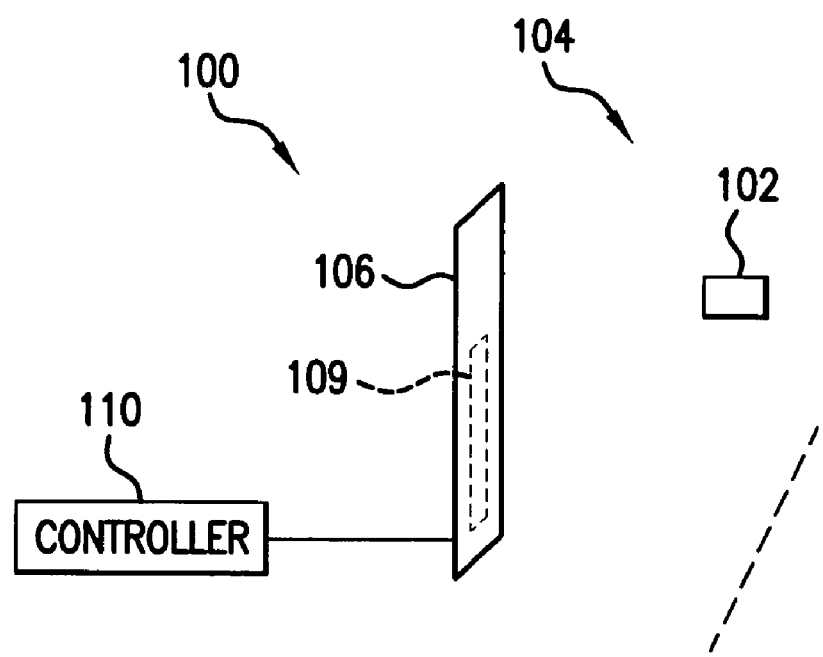
FIG. 1 is a schematic illustration of an exemplary EAS system including a core antenna system consistent with the invention.

FIG. 1 illustrates an EAS system 100 including a core antenna system 109 consistent with the invention. The EAS system 100 generally includes a controller 110 and a pedestal 106 for housing the core antenna system 109. The controller 110 is shown separate from the pedestal 106 for clarity but may be included in the pedestal housing as well. In the exemplary embodiment of FIG. 1, the antenna system 109 is configured as a transceiver and the associated controller 110 includes proper control and switching to switch from transmitting to receiving functions at predetermined time intervals. Those skilled in the art will recognize that there may be a separate transmitting antenna and receiving antenna located on the same side or on separate sides of the interrogation zone 104.

An EAS marker 102 is placed, e.g. by a manufacturer or retailer, on each item or asset to be protected. If the marker is not removed or deactivated prior to entering an interrogation zone 104, the field established by the antenna will cause a response from the EAS marker 102. The core antenna system 109 acting as a receiver will receive this response, and the controller 110 will detect the EAS marker response indicating that the marker is in the interrogation zone 104.

Figure 2:
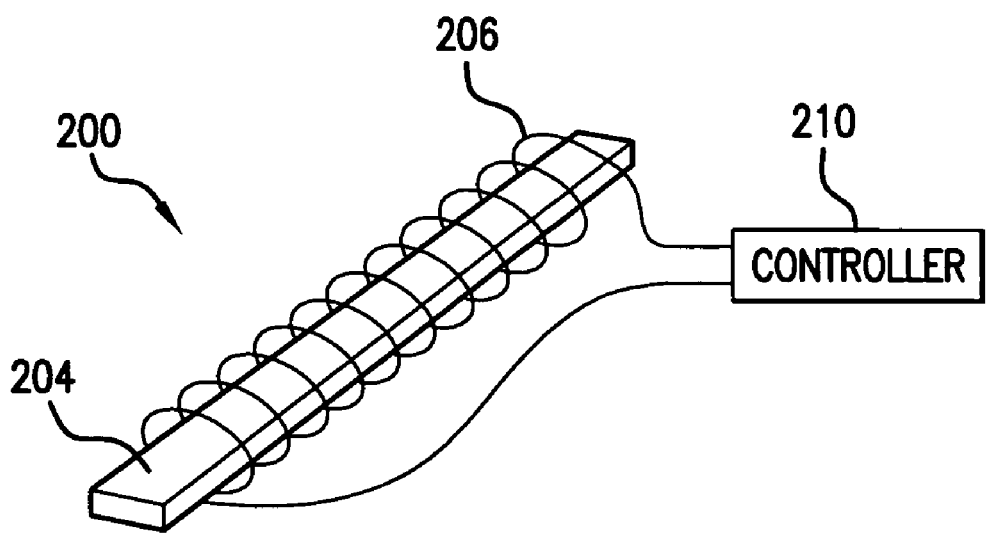
FIG. 2 is a perspective view of an exemplary core antenna for use in a core antenna system consistent with the invention.

FIG. 2 illustrates an exemplary core antenna 200 that may be utilized in the core antenna system 109 of FIG. 1. The magnetic core antenna 200 generally includes a core 204 with a wire coil winding 206 thereon. The wire coil winding 206 is coupled to controller 210. When the magnetic controller 210 is acting as a transmitter, the controller provides an excitation signal, e.g., a drive current, to the coil 206 to generate the desired magnetic field.

The magnetic properties and the geometry of the core 204 may be optimized for a particular application. The shape of the core 204 may be any of a variety of shapes, e.g. rectangular, cylindrical, spherical, etc. The core 204 may be formed of a powdered iron or any other suitable magnetic material such as ferrite, an amorphous laminated core, or a nanocrystalline laminated core, etc. The conductor size of the coil winding 206 and the number of turns is also selected based on the performance requirements of the generated magnetic field. The controller 210 may provide an excitation signal to the coil winding 206 to produce an appropriate magnetic field.

In order to establish a sufficiently large magnetic field at a distance near the antenna (i.e.: in the interrogation zone of the EAS or RFID system) and a sufficiently small magnetic field at a distance far away from the antenna (i.e., outside of the interrogation zone of the EAS or RFID system but sufficiently close to locations where regulatory compliance measurements are made), a field canceling arrangement for magnetic core antennas is presented. Various antenna configurations and arrangements may be implemented in a manner consistent with the invention to produce such field cancellation.

Figure 3:
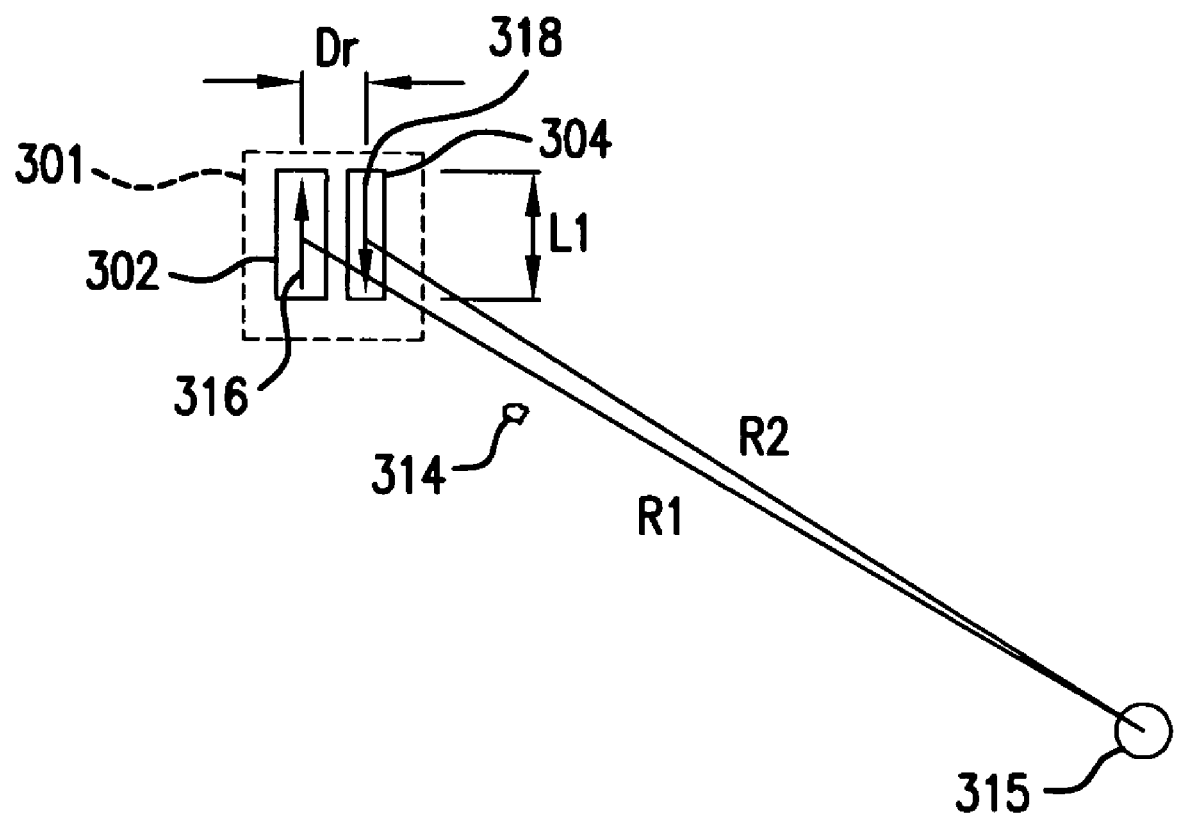
FIG. 3 is schematic illustration of an exemplary core antenna system consistent with the invention.

Turning to FIG. 3, for example, a magnetic core antenna system 301 having two core antennas 302, 304 is illustrated. The core antennas 302, 304 are separated by a radial distance Dr, and are driven to establish magnetic fields in opposite directions or phases, as indicated by arrows 316 and 318. At a measurement location 314 near the antenna, which is within about the same distance away from the antenna as the longest dimension of the core antenna, e.g., its length L1, the field from the nearest antenna will dominate. At a measurement location 315 far away from the antenna, however, the magnetic fields from the first core antenna 302 and second core antenna 304 are substantially equal and opposite, resulting in field cancellation. The measurement point far away from the antenna may be about 5 to 10 times the distance to the measurement location near the antenna, whereby the distance R1 from the first antenna 302 to the location 315 is approximately equal to the distance R2 from the second antenna 304 to the location and R1≈R2>>Dr. In this configuration, with the antennas 302 and 304 driven out of phase with each other, the magnetic field strength in the interrogation zone (i.e. near the antenna) is sufficiently strong and the magnetic field strength outside of the interrogation zone (i.e. far away from the antenna) is sufficiently weak to comply with regulatory requirements.

Figure 4A:
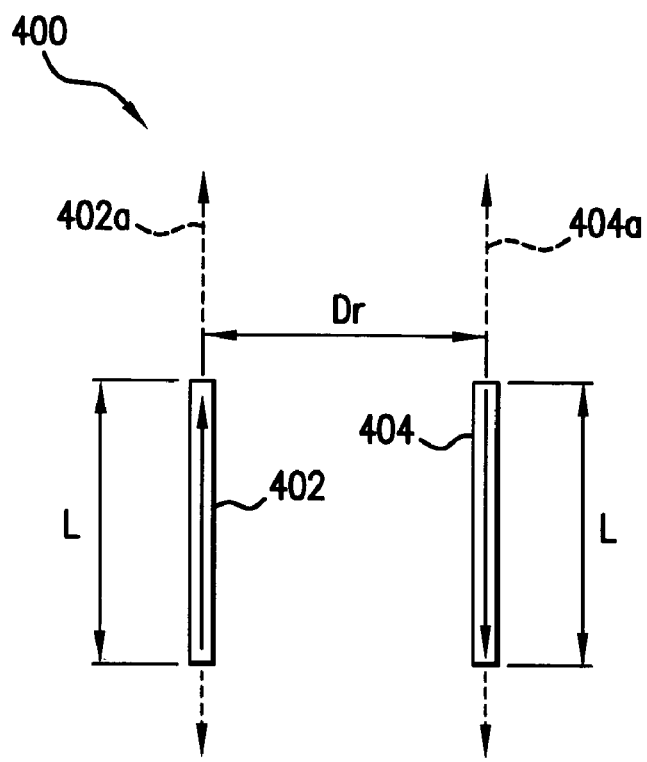
FIG. 4A is a schematic illustration of one embodiment of a core antenna system consistent with the invention where a first core antenna is separated by a radial distance from a second core antenna.
Figure 4B:
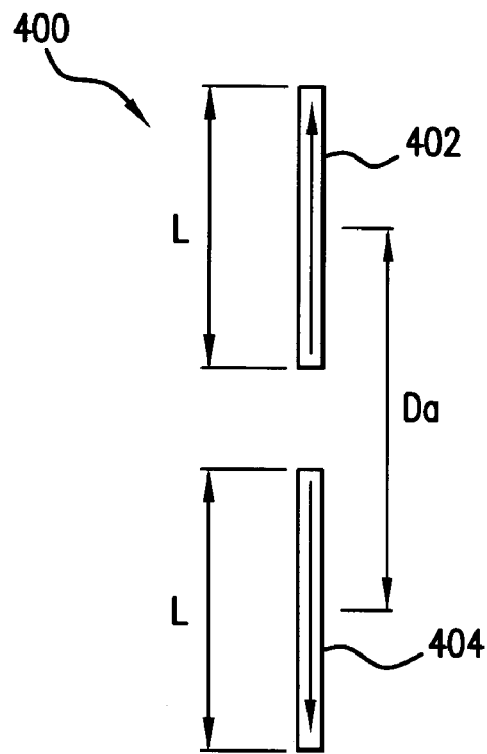
FIG. 4B is a schematic illustration of another embodiment of a core antenna system consistent with the invention where a first core antenna is separated by an axial distance from a second core antenna.
Figure 4C:
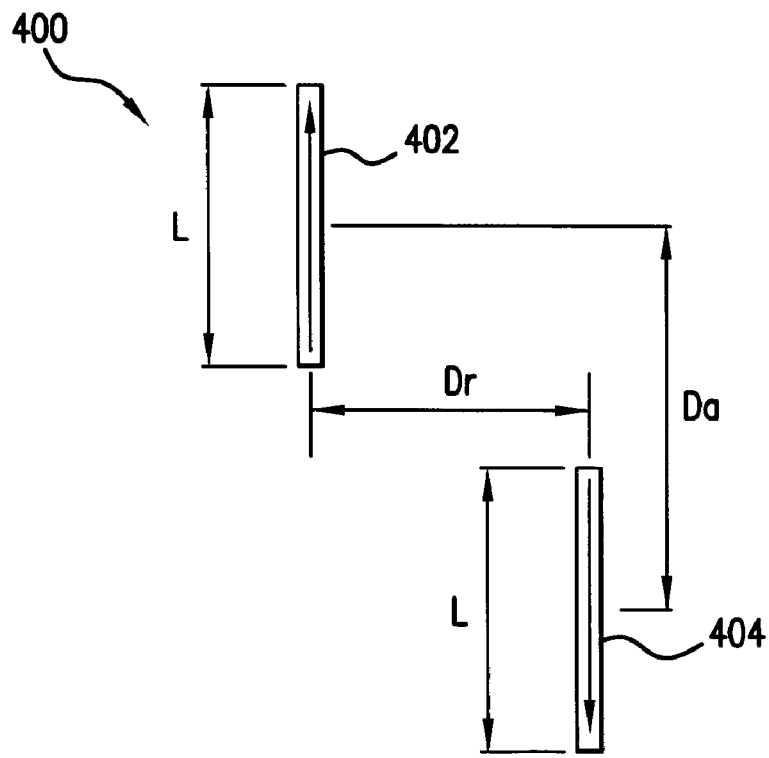
FIG. 4C is schematic illustration of yet another embodiment of a core antenna system consistent with the invention where a first core antenna is separate by both a radial distance and an axial distance from a second core antenna.

FIGS. 4A to 4C illustrate a core antenna system 400 having a pair of core antennas 402, 404 for achieving distant cancellation. The pair of core antennas generally includes a first core antenna 402 and a second core antenna 404 of approximately the same length L. Each core antenna 402, 404 is driven by an associated transmitter at similar levels to produce a magnetic field of similar strength, yet out of phase with each other (i.e. in opposite directions), as indicated by the arrows associated with the antennas 402, 404. These out-of-phase magnetic fields can be generated by driving an associated winding coil of each core antenna 402, 404 with a substantially equal current, but in an opposing direction. In general, the first core antenna 402 and second core antenna 404 may be positioned at a predetermined offset from each other.

As shown in FIG. 4A, the offset distance between the first core antenna 402 and the second core antenna 404 may be a radial offset distance Dr. The radial distance Dr is measured perpendicular to the lengthwise axes 402*a*, 404*a* of the core antennas. The offset distance may alternatively or also be an axial distance Da, as illustrated in FIG. 4B. As illustrated in FIG. 4C, the offset distance may be a combination of both a radial offset Dr and an axial offset Da. The actual radial offset Dr and axial offset Da distances for the embodiments of FIGS. 4A to 4C depend on a number of factors including generally the strength of the magnetic field from each antenna and the desired amount of field offset and canceling to occur at various distances from the antennas.

Figure 5:
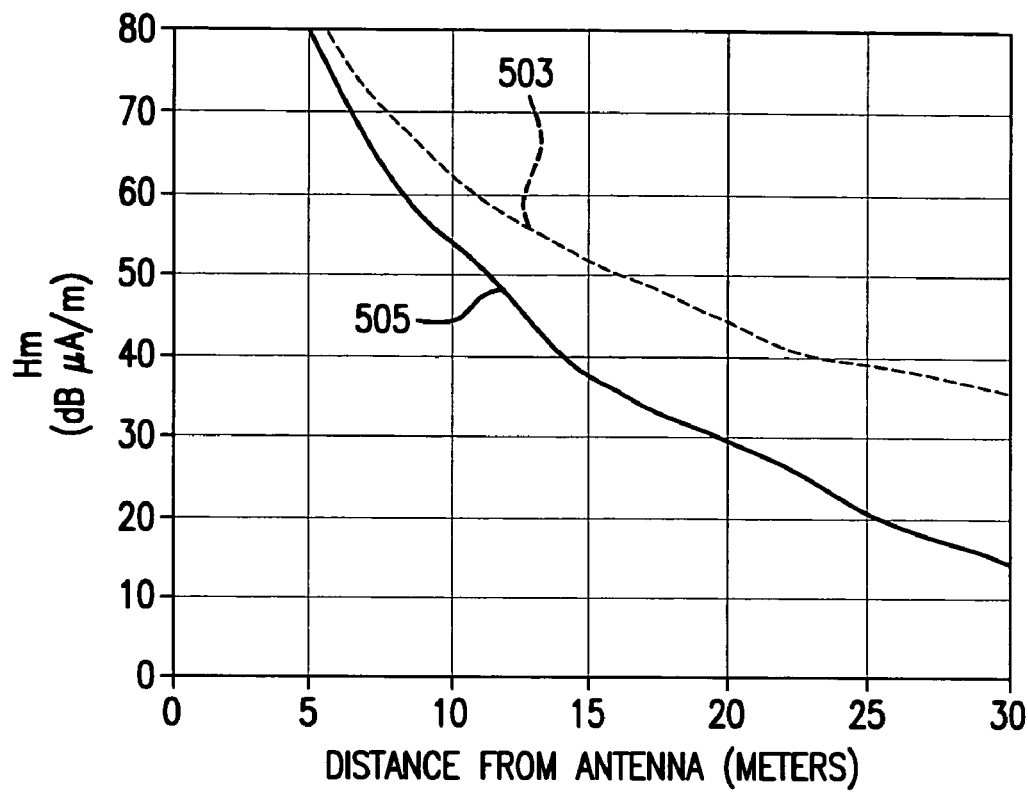
FIG. 5 is a plot of magnetic field strength versus distance for a core antenna system consistent with the invention.

Advantageously, by driving the antennas out of phase with each other the magnetic field at large distances may be decreased compared to those levels that it otherwise would be without a field canceling arrangement. FIG. 5 includes an exemplary plot 505 of the magnetic field strength vs. distance for a field canceling core antenna system consistent with the embodiment of FIG. 4A where the antennas are separated an offset distance in the radial direction Dr. As illustrated, the magnetic field distance at 30 meters from the antennas drops to about 15 dB μA/m. In contrast, the exemplary plot 503 is a plot of magnetic field strength vs. distance from a non-field canceling arrangement including a single core antenna. At the same 30 meter distance, the magnetic field for the non-field canceling arrangement is about 35 dB μA/m. In the illustrated exemplary embodiment, the field canceling arrangement results in a 20 dB decrease in radiated fields for the antennas at a distance of 30 meters from the antennas.

Figure 6:
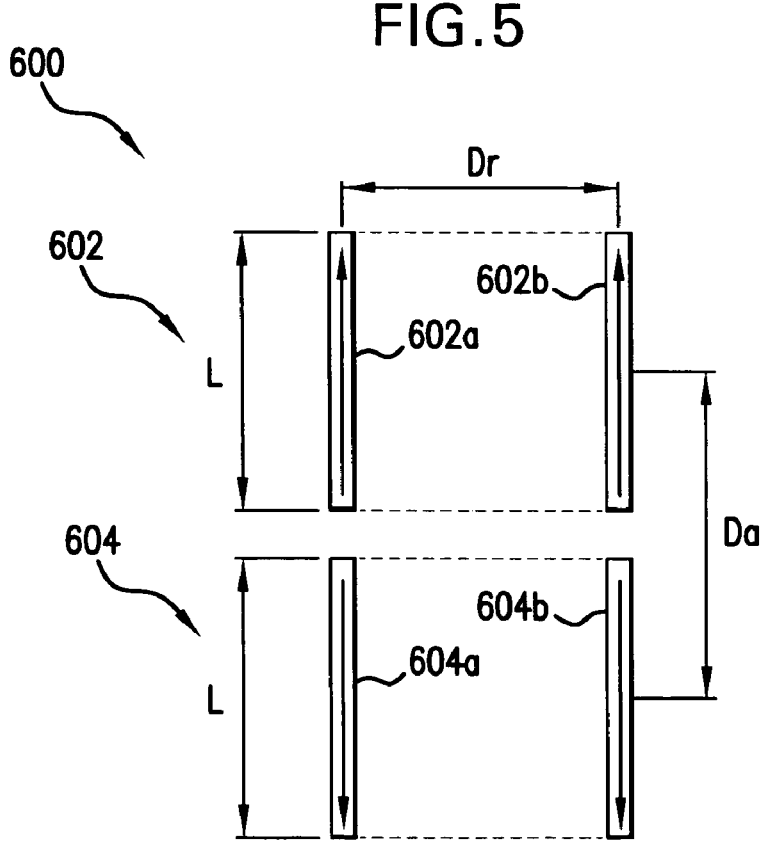
FIG. 6 is a schematic illustration of yet another embodiment of a core antenna system consistent with the invention having a first pair and second pair of core antennas.

FIG. 6 illustrates yet another embodiment of a core antenna system 600 consistent with the invention. In general, the system 600 includes a first pair 602 and second pair 604 of core antennas. The antenna pairs are separated by an axial distance Da. The first pair 602 of antennas may include a first 602*a* and second 602*b* antenna having a length L. The antennas 602*a* and 602*b* are separated by a radial distance Dr, and are each driven to produce a magnetic field in a first direction, as indicated by the arrows associated therewith. The second pair 604 of antennas may include a first 604*a* and second 604*b* antenna also having a length L. The antennas 604*a* and 604*b* are also separated by a radial distance Dr, and are each driven to produce a magnetic field in a second direction, as indicated by the arrows associated therewith. The second direction is opposite the first direction, i.e. the antenna pairs are driven out of phase with each other, to provide for beneficial canceling of fields at locations far from the antennas. Of course, those skilled in the art will recognize that each of the various embodiments of FIGS. 4A to 4C may include multiple antennas arranged in a multiple groups where the groups are driven out of phase with each other to provide field canceling.

Figure 7:
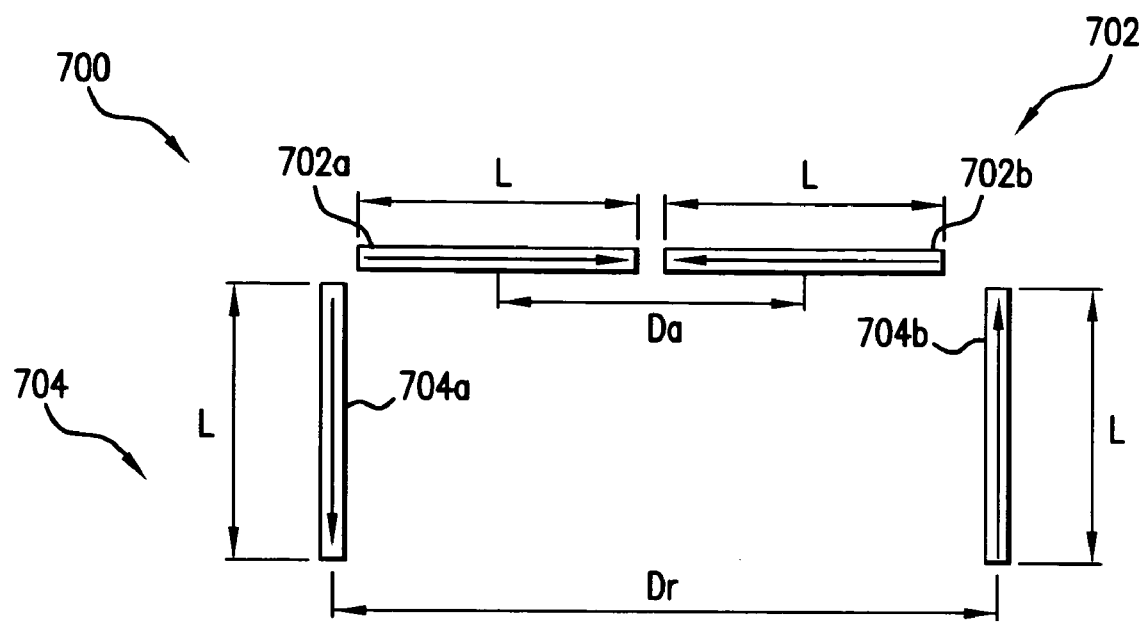
FIG. 7 is a schematic illustration of yet another embodiment of a core antenna system consistent with the invention having a first pair of core antennas positioned orthogonally to a second pair of core antennas.

Turning now to FIG. 7, yet another embodiment of a core antenna system 700 consistent with the invention is illustrated. The antenna system 700 includes a first pair 702 of core antennas 702*a*, 702*b* having length L disposed orthogonally to a second pair 704 of core antennas 704*a*, 704*b*. The first pair 702 of core antennas 702*a*, 702*b* having similar length L are separated by an axial offset distance Da and are driven out of phase with each other to establish magnetic fields in opposing directions as indicated by the associated arrows. The second pair 704 of core antennas 704*a*, 704*b* are separated by a radial distance Dr, have similar length L, and are also driven out of phase with each other as indicated by the associated arrows.

Figure 8:
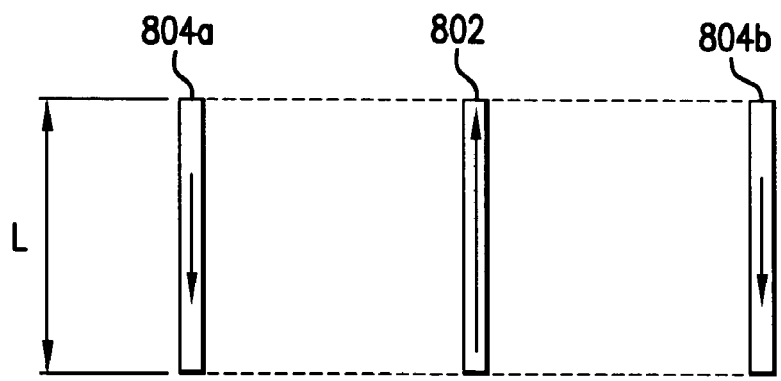
FIG. 8 is a schematic illustration of yet another embodiment of a core antenna system consistent with the invention having a main core antenna driven at one drive level and a plurality of secondary core antennas driven at a different drive level.

FIG. 8 illustrates yet another embodiment of a core antenna system 800 consistent with the invention. The illustrated exemplary embodiment 800 includes a main antenna 802 that is driven at a first level to establish a magnetic field in a first direction. Two or more secondary antennas 804*a*, 804*b* are driven at associated lower levels to establish a total magnetic field emanating from the secondary antennas that sums to an equal and opposite magnetic field as produced by the main core antenna 802 at a large distance from the antennas.

For example, the main antenna 802 may have a length L and may be driven at 100% in a first direction to produce a magnetic field oriented in a first direction. One secondary core antenna 804*a* may be have a similar length L as the main antenna 802, but may be driven out of phase with the main antenna at only 50% of the level of the main antenna 802. Another secondary core antenna 804b having length L may also be driven out of phase with the main antenna at only 50% of the level of the main antenna. As such, the secondary antennas 804a, 804b provide magnetic fields at a direction opposite to the field from the main antenna that sum to a level that is cancelled by the magnetic field from the main antenna 802 at a large distance from the antennas. Those skilled in the art will recognize a configuration consistent with the invention may include one or more main core antennas and/or one or more secondary antennas as long as the fields from the main antennas are substantially equal and opposite to the sum of the fields from the secondary antennas at a large distance from the antennas.

Figure 9:
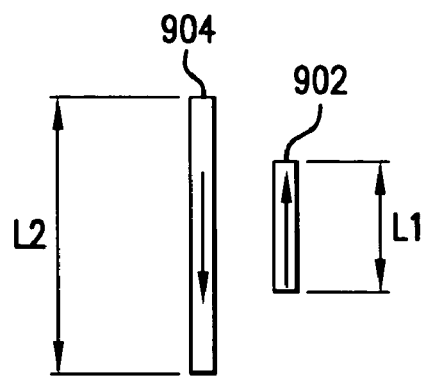
FIG. 9 is a schematic illustration of yet another embodiment of a core antenna system consistent with the invention having one core antenna of one length and a second core antenna of a different length, where each is driven at separate drive levels.

FIG. 9 illustrates yet another embodiment of a core antenna system 900 consistent with the invention where antennas of different length are driven at different drive levels. In the exemplary embodiment of FIG. 9, a first core antenna 902 has a first length L1 that is shorter than a second length L2 of a second core antenna 904. The first core antenna 902 is driven at a 100% drive level to establish a magnetic field from the first core antenna 902 in a first direction as indicated by the associated arrow. The second core antenna 904 is driven at a lesser drive level than the level of the first core antenna and out of phase with the first core antenna 902, i.e. in to establish a field in an opposite direction from the field established by the first core antenna.

The magnetic fields from the first core antenna 902 and second core antenna 904 may decrease at different rates as the distance from the antennas increases given the different sizes of the antennas. Due to these differences, the pair of antennas 902, 904 may be designed to provide for very high levels of field canceling at large distances away from the antennas 902, 904 even though the fields from the antennas do not exactly match.

Those skilled in the art will recognize that there are many variations of field canceling embodiments consistent with the invention that may be constructed with core antennas. The embodiments described herein are illustrative of only some of the embodiments. In addition, depending on the application, full field canceling may not be necessary. Any of the aforementioned embodiments can also be utilized to achieve partial field canceling.

In EAS and RFID applications, it is desirable to reliably detect any marker in the interrogation zone regardless of its position or orientation in the zone. If, however, null zones appear in the interrogation zone a marker passing through the null zone may not be properly detected. Such null zones occur with magnetic core antennas since core antennas have certain regions where the magnetic field vectors from the antenna are perpendicular to a marker. In addition, systems using multiple core antennas have certain regions where the magnetic field vectors from adjacent core antennas cancel one another out. As a result of this and uneven field distribution, the interrogation field may be strong enough at some or most locations in the interrogation zone to provide for proper detection of a marker, while not being strong enough at other null zone locations.

In order to reduce, eliminate, or in some instances move such null zones, an EAS or RFID system consistent with the invention may include a phase flipping arrangement. In general, phase flipping refers to switching the phasing of some or all of the core antennas in a system during different, typically sequential, time periods. During these time periods, phasing may be reversed on some of the core antennas in a transmitter array so that the magnetic field vectors change from one direction to another. This serves to reduce, eliminate, or move null zone regions to improve the detection ability of an associated EAS or RFID system.

Figure 10A:
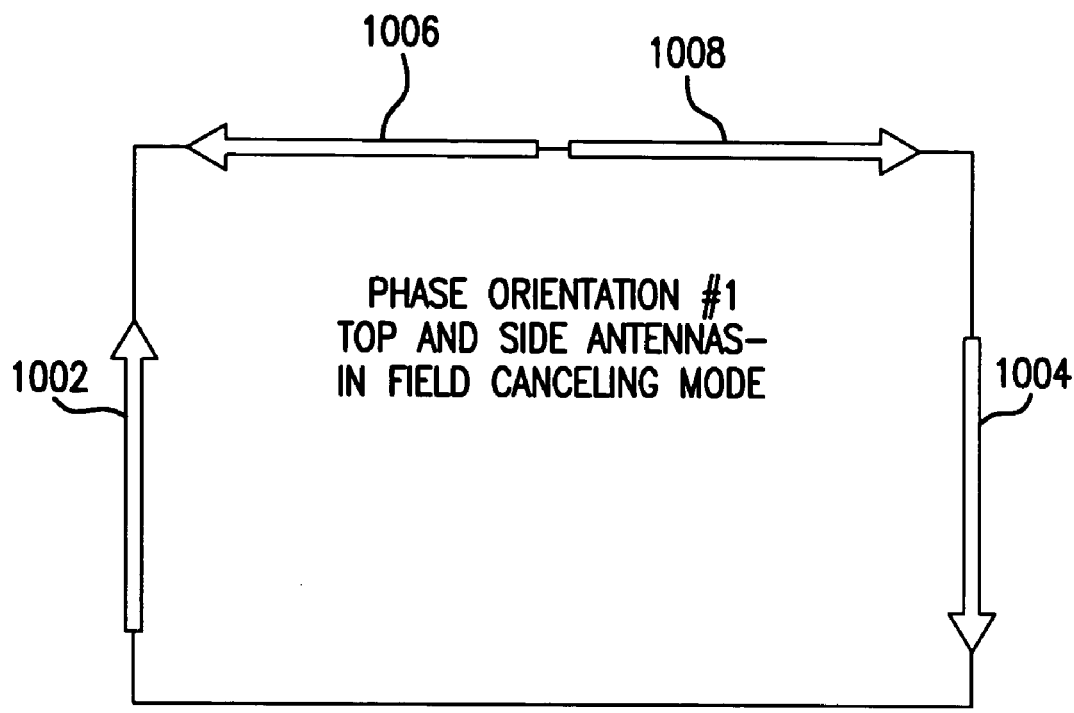
FIGS. 10A and 10B are schematic illustrations of a core antenna system consistent with the invention illustrating operation in a first phase orientation (FIG. 10A) and second phase orientation (FIG. 10B) to illustrate phase flipping for reduction of null zones.
Figure 10B:
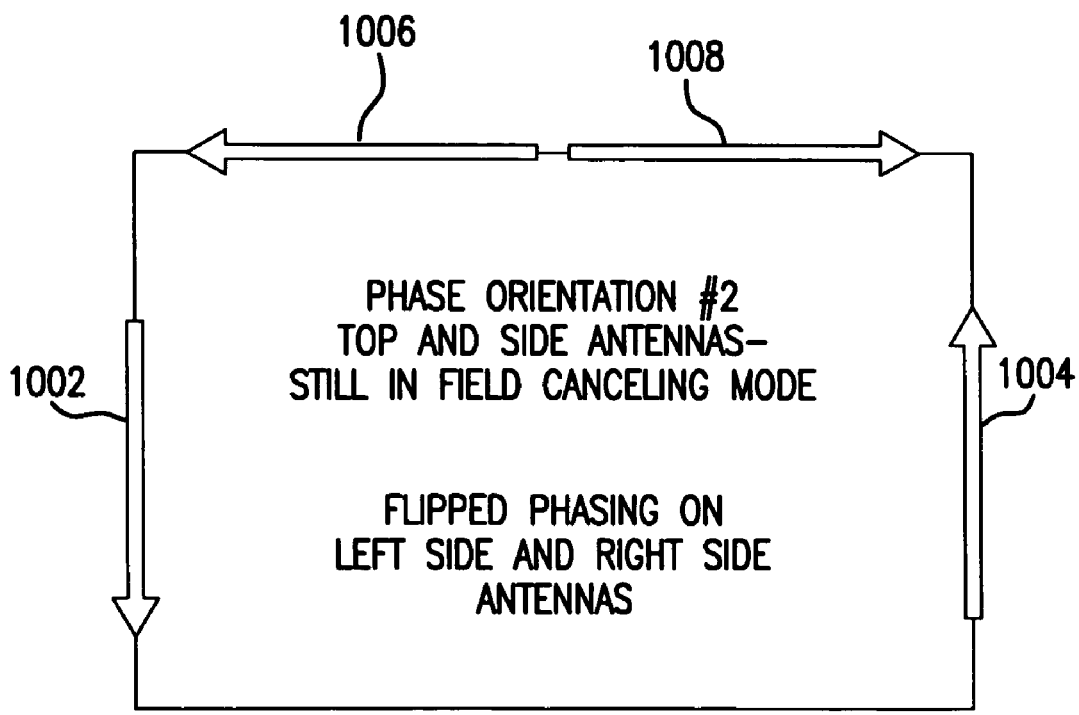

Turning to FIGS. 10A and 10B, for example, an exemplary field canceling and phase flipping arrangement consistent with the invention is illustrated. In the illustrated exemplary embodiment, two core antennas 1002, 1004 are positioned orthogonally to two more core antennas 1006, 1008. Core antennas 1002, 1004 are driven out of phase with each other, and core antennas 1006, 1008 are driven out of phase with each other. Driving the antennas in and out of phase relationship, as indicated, provides reduction benefits at distant locations, as earlier detailed. For simplicity and ease of explanation, a controller for driving the antennas is not shown. Those skilled in the art will recognize, however, that the antennas may be driven by a single controller providing associated excitation signals for each antenna, or by separate controllers.

FIG. 10A illustrates a field canceling and phase flipping arrangement during a first phase orientation, while FIG. 10B illustrates a field canceling and phase flipping arrangement in a second phase orientation. The antennas may be driven to periodically switch between the first and second phase orientations. During the first phase orientation, shown in FIG. 10A, and second phase orientation, shown in FIG. 10B, core antennas 1006 and 1008 retain their phase orientation as indicated by the associated arrows. That is, in both phase orientations the antennas 1006 and 1008 are driven out of phase and in the same respective directions.

Advantageously, the side core antennas 1002 and 1004 remain out of phase with each other but reverse or flip phasing from the first phase orientation to the second phase orientation, as indicated by the reversed direction of the arrows associated therewith. Field canceling benefits for antennas 1002, 1004 are retained during both phases since the antennas remain out of phase with each other in both phase orientations. Phase flipping between phase orientations, however, results in an improvement in system performance due to the reduction, elimination, or movement of null zones.

FIGS. 11A–C, 12A–C, and 13A–C illustrate the operation and benefits of a phase flipping configuration consistent with the invention. For each orientation of the tag (horizontal, vertical, and lateral) in the interrogation zone, a contour plot of magnetic field intensity H (dB A/m) across the width and height of the interrogation zone is illustrated.

Figure 11A:
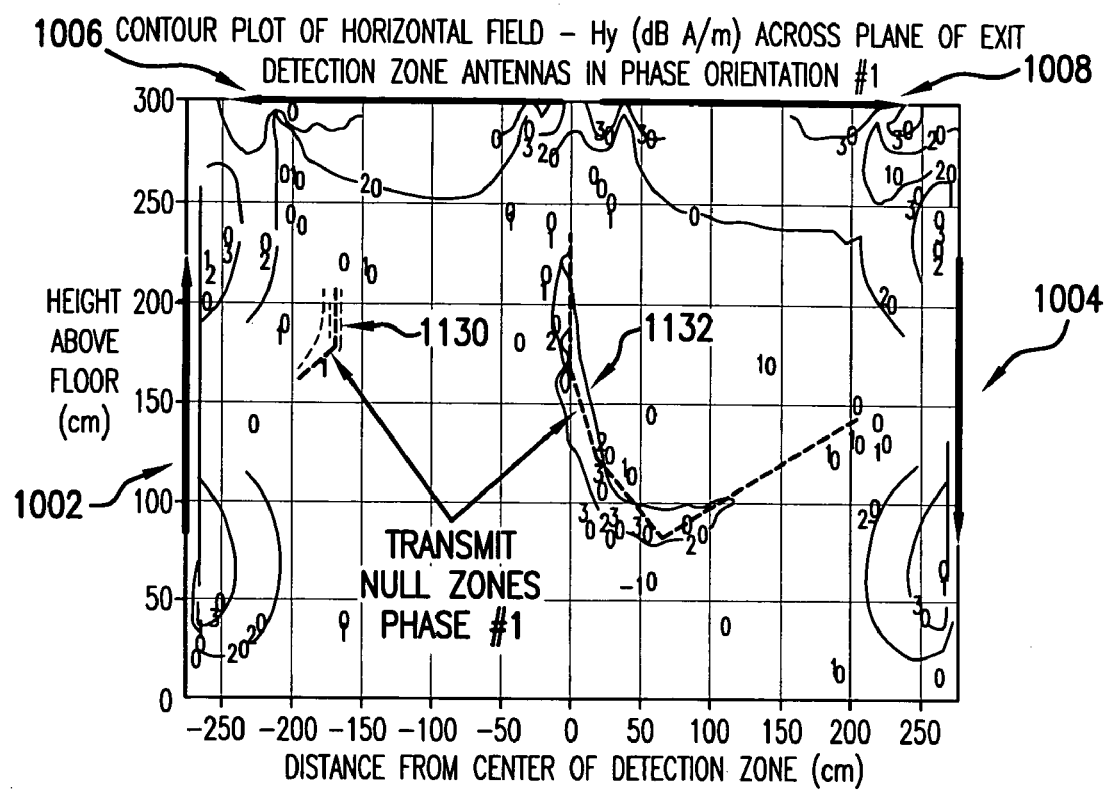
FIGS. 11A to 11C are schematic illustrations of a core antenna system consistent with the invention including plots of magnetic field strength in the horizontal field across the plane of the exit interrogation zone during a first phase orientation (FIG. 11A), second phase orientation (FIG. 11B) and during a composite of both phase orientations (FIG. 11C)
Figure 11B:
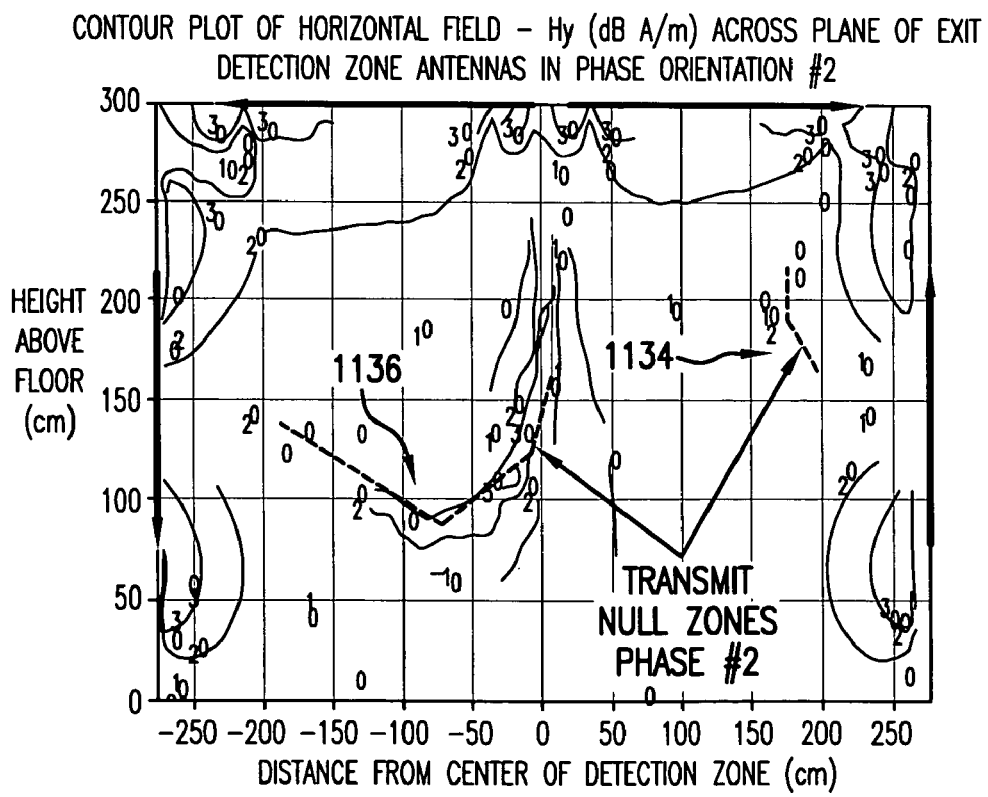

FIG. 11A illustrates the horizontal magnetic field strength Hy (dB A/m) across the plane of the interrogation zone during first phase orientation of core antennas 1002, 1004, 1006, and 1008 shown in FIG. 10A. As shown, in the illustrated embodiment null zones 1130, 1132 are established in the interrogation zone during the first phase orientation. FIG. 11B illustrates the horizontal magnetic field strength across the plane of the interrogation zone during the second phase orientation shown in FIG. 10B. Again, in the second phase orientation the phase orientation of antennas 1006 and 1008 have reversed from that of the first phase. As shown, null zones 1134, 1136 result during the second phase orientation.

Figure 11C:
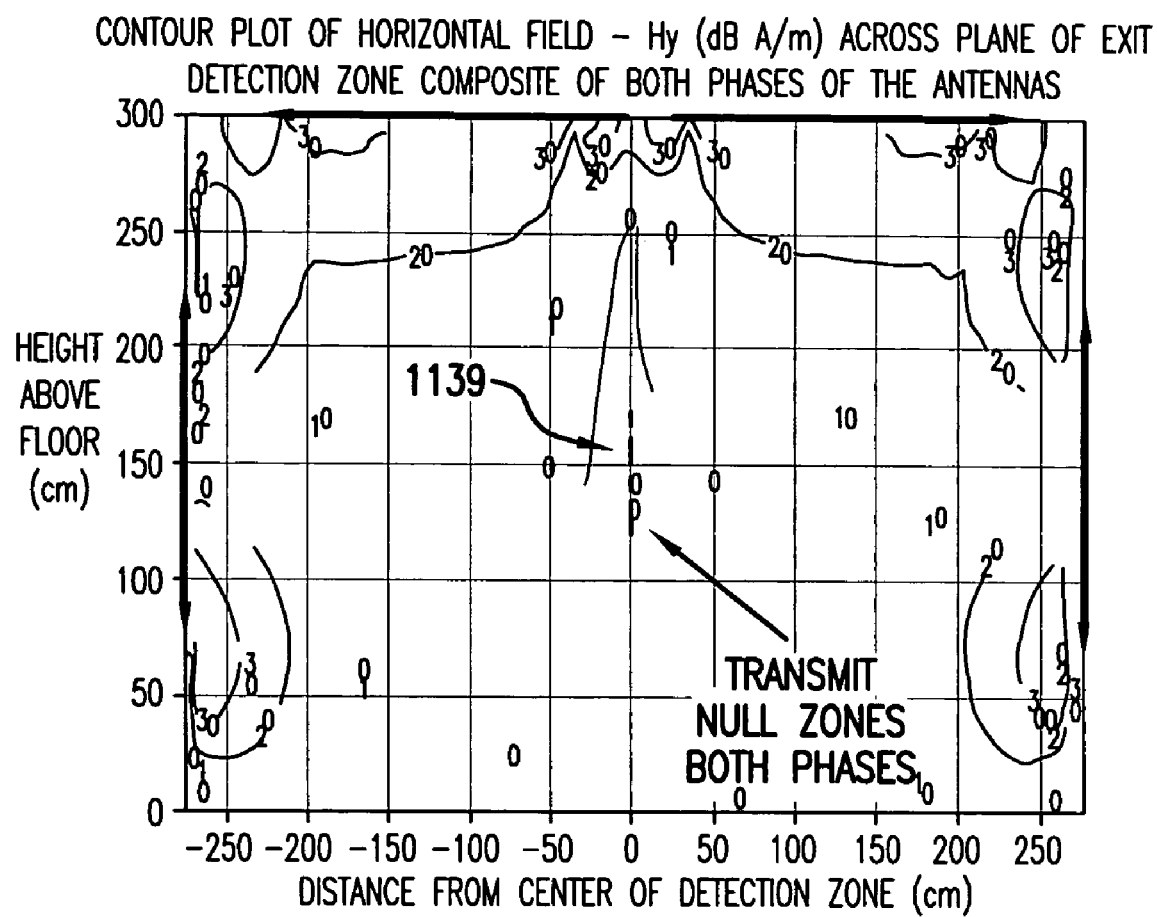

The horizontal field strength for the composite of both the first and second phase orientations is illustrated in FIG. 11C. As shown, by periodically changing from the first phase orientation to the second phase orientation, the null zones 1130, 1132 appearing in the first phase and the null zones 1134, 1136 of the second phase are effectively reduced to the composite null zone 1139. The composite null zone 1139 represents a much smaller area of the interrogation zone than the null zones appearing in the first and second phase orientations.

Figure 12A:
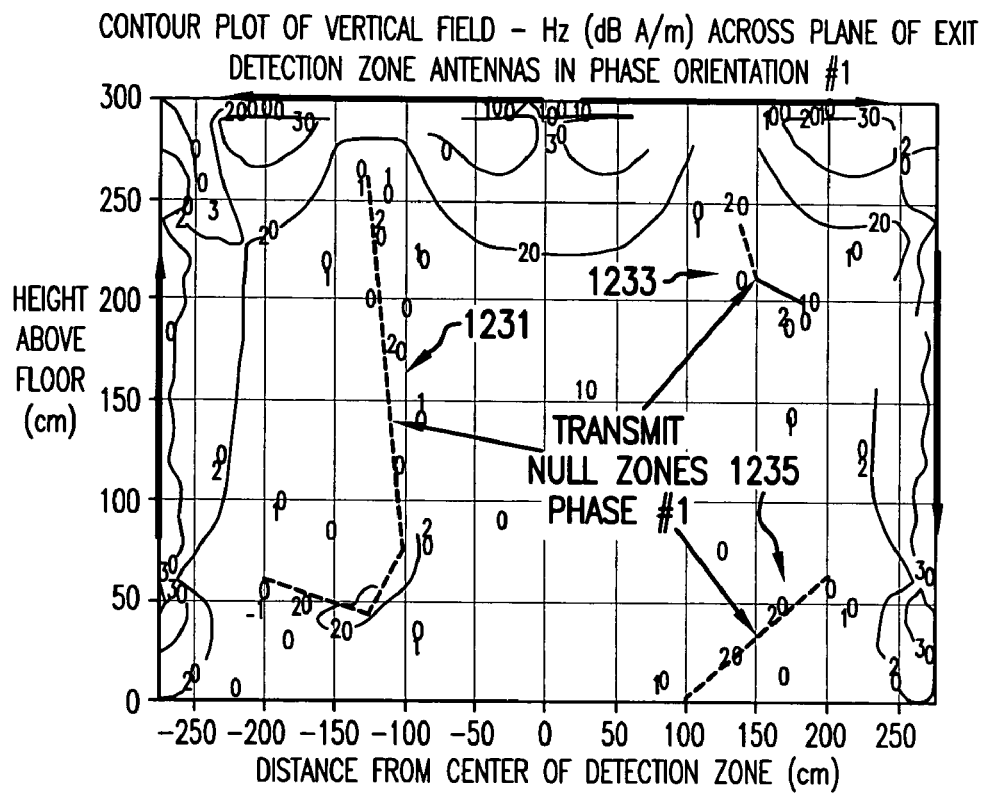
FIGS. 12A to 12C are schematic illustrations of a core antenna system consistent with the invention including plots of magnetic field strength in the vertical field across the plane of the exit interrogation zone during a first phase orientation (FIG. 12A), second phase orientation (FIG. 12B) and during a composite of both phase orientations (FIG. 12C)
Figure 12B:
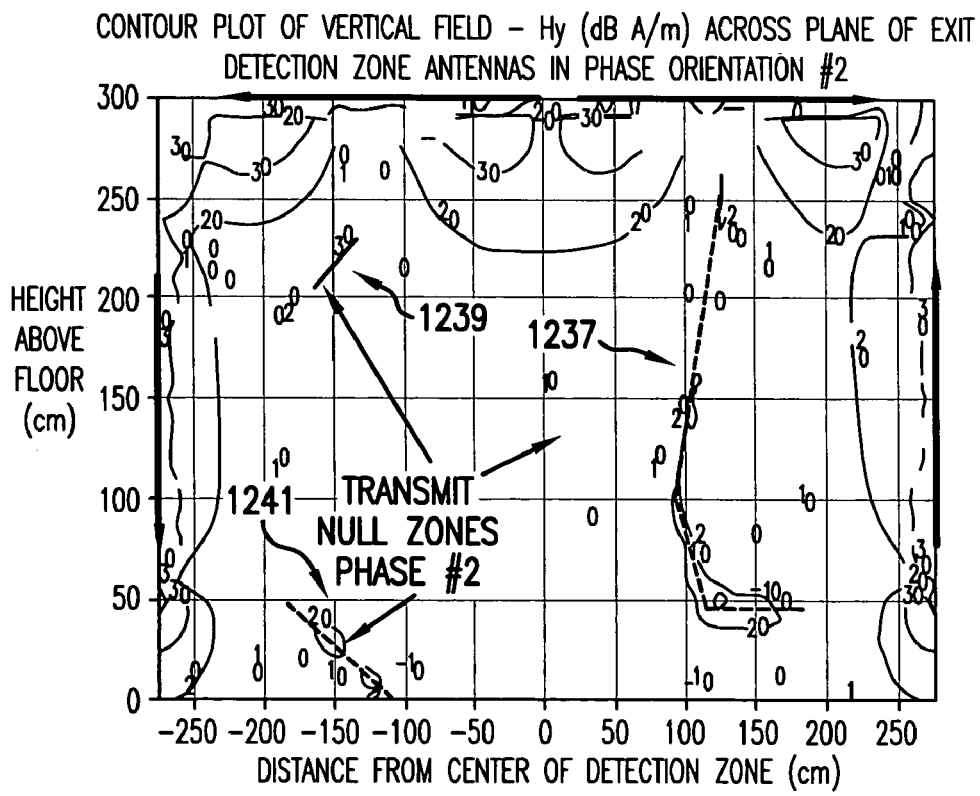
Figure 12C:
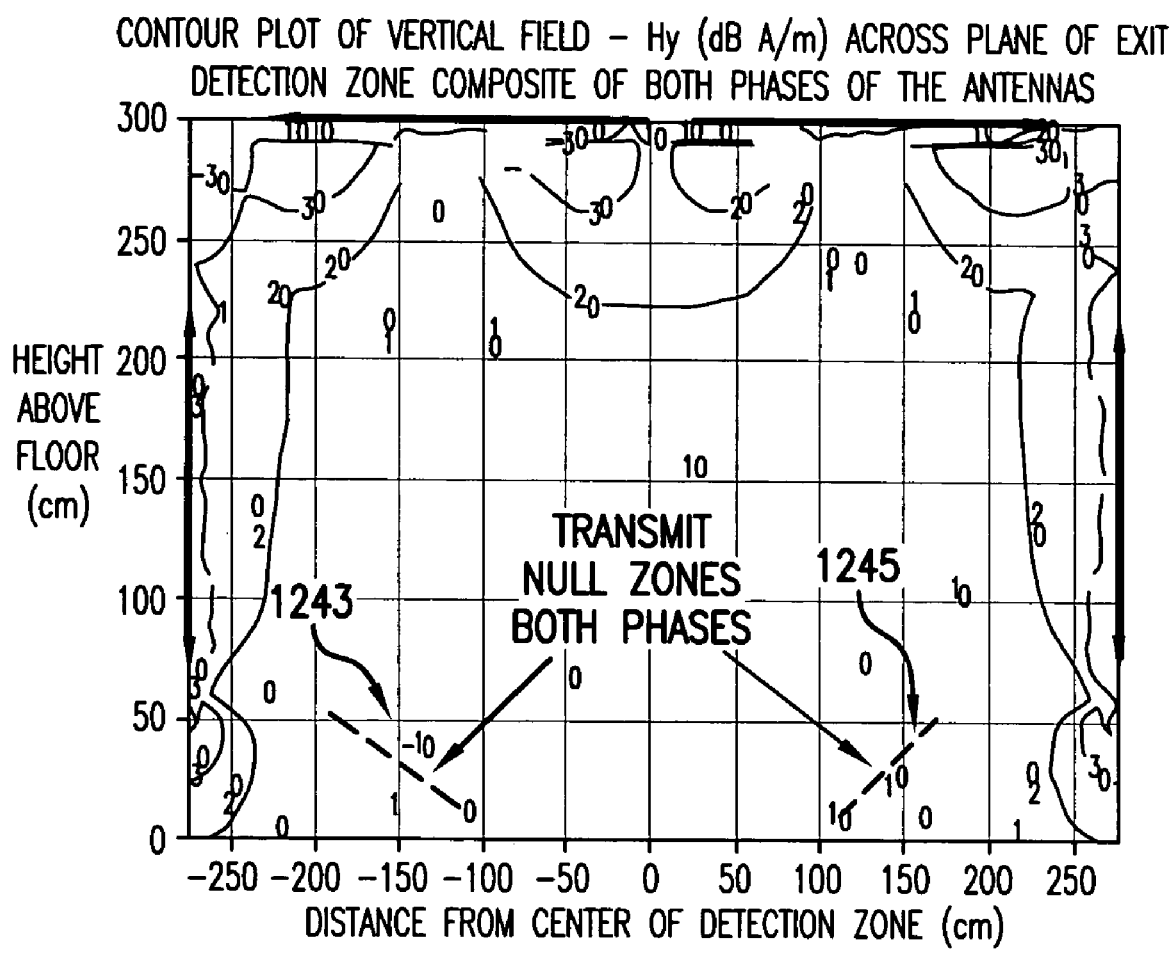

FIG. 12A illustrates the vertical magnetic field strength Hz (dB A/m) across the plane of the interrogation zone during the first phase orientation and the resulting null zones 1231, 1233, 1235 in the vertical field. FIG. 12B illustrates the null zones 1237, 1239, 1241 during the second phase orientation, where orientations of the antennas 1006 and 1008 have flipped from that of the first phase orientation. The vertical field strength for the composite of both the first and second phase orientations is illustrated in FIG. 12C. As with the horizontal field, the composite or effective null zones 1243, 1245 represent a much smaller area of the interrogation zone than the null zones appearing in the first and second phase orientations. In addition, the effective null zones 1243, 1245 have been moved to a more desirable location. For instance, a sensitive receiver near the floor (0 cm on the y-axis) may still be able to detect markers in the effective null zones 1243, 1245.

Figure 13A:
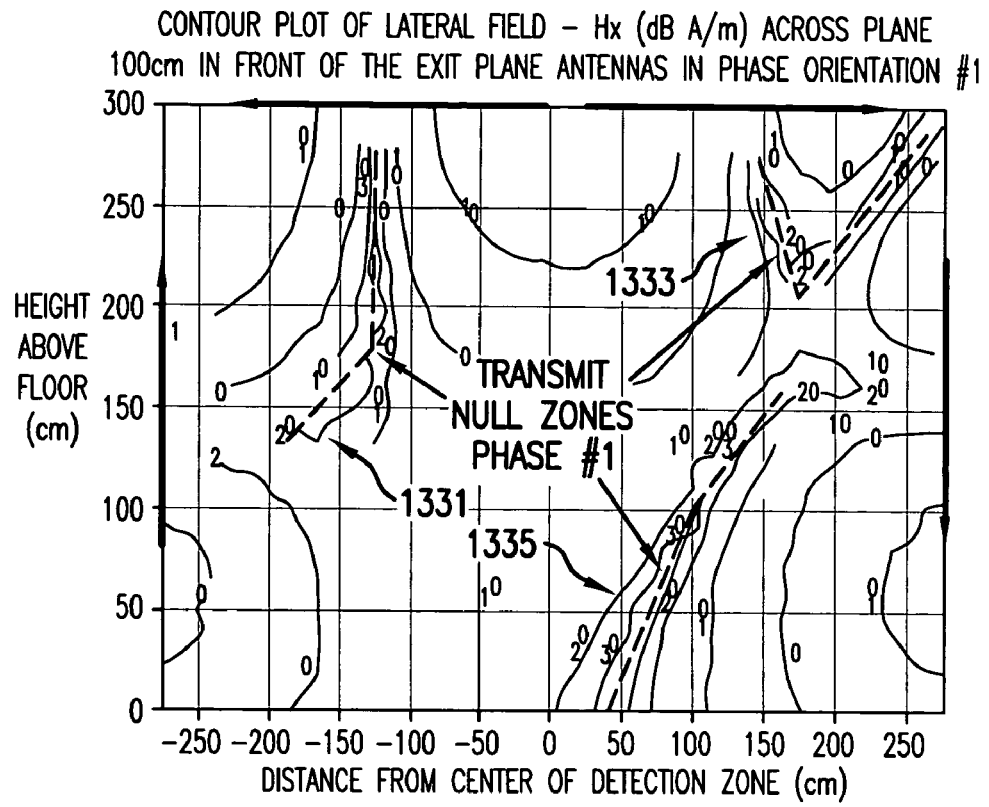
FIGS. 13A to 13C are schematic illustrations of a core antenna system consistent with the invention including plots of magnetic field strength in the lateral field across a plane 100 cm in front of the exit plane during a first phase orientation (FIG. 13A) second phase orientation (FIG. 13B) and during a composite of both phase orientations (FIG. 13C).
Figure 13B:
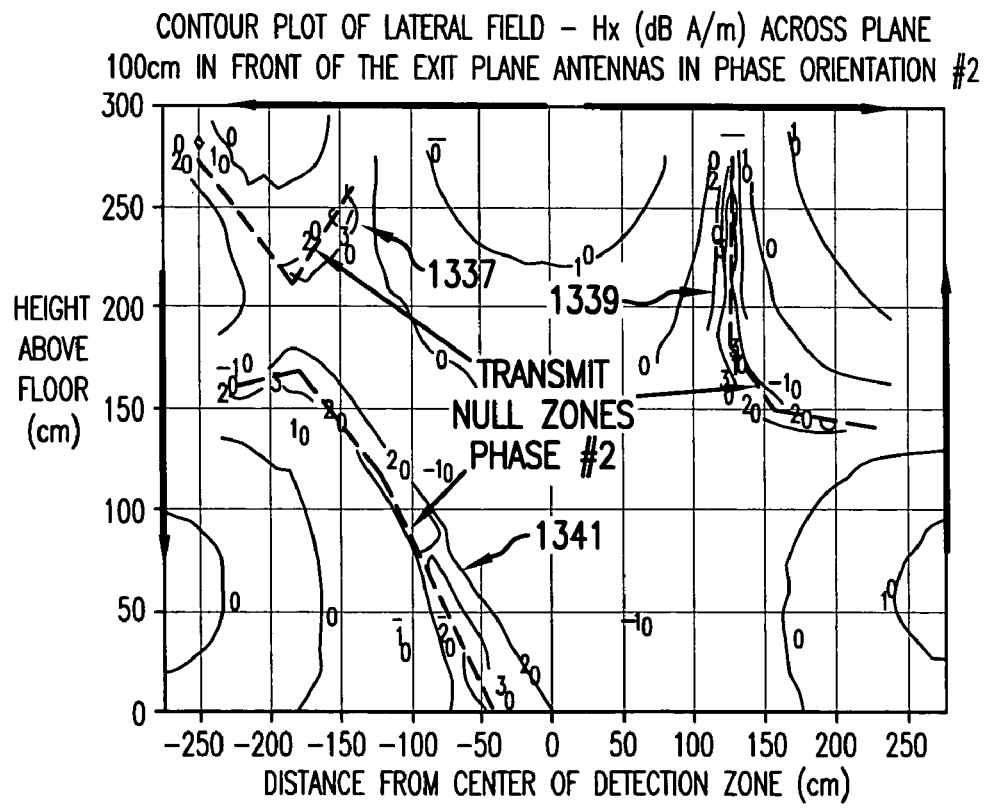
Figure 13C:
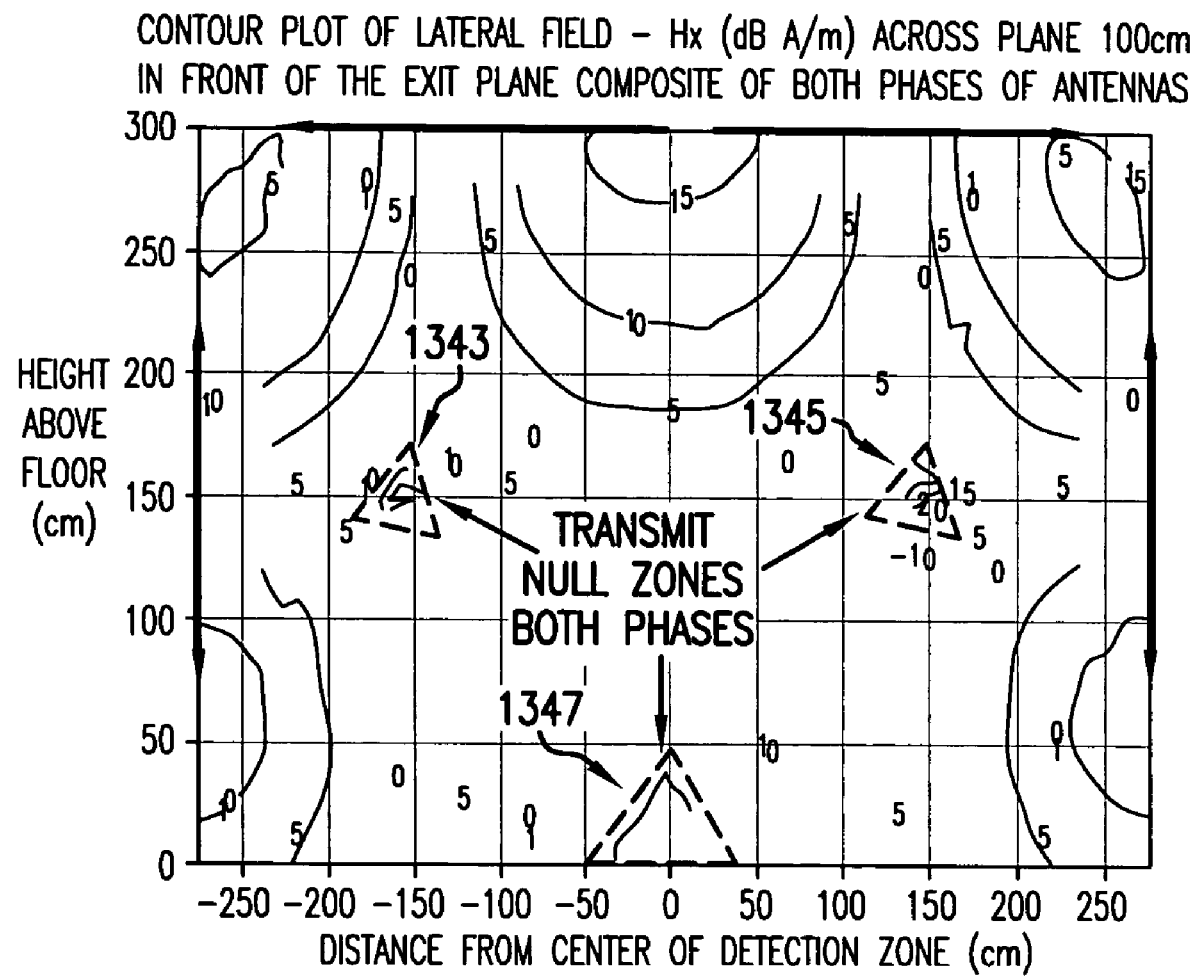

FIGS. 13A to 13C illustrate a plot of the lateral magnetic field strength Hx (dB A/m) across a plane 100 cm in front of the exit plane. FIG. 13A illustrates the lateral magnetic field strength Hx (dB A/m) across the plane 100 cm in front of the exit plane during first phase orientation and the resulting null zones 1331, 1333, 1335 in the lateral field. FIG. 13B illustrates the null zones 1337, 1339, 1341 during the second phase orientation, where phases of the antennas 1006 and 1008 have flipped from that of the first phase orientation. The lateral field strength for the composite of both phases is illustrated in FIG. 13C. Again, the composite or effective null zones 1343, 1345, 1347 represent a much smaller area of the interrogation zone than the null zones associated with the first and second phase orientations. As such, phase flipping consistent with the invention serves to reduce, eliminate, or move to a more advantageous location the effective null zones in each orientation of the magnetic field about the interrogation zone.

Although phase flipping is illustrated in FIGS. 10A–B to operate in conjunction a field canceling configuration, phase flipping may also be utilized individually. Also, phase flipping can occur with respect to any number of antennas in a system. In the system illustrated in FIGS. 10A–B, for example, antennas 1006 and 1008 may also be configured for phase flipping between sequential phase orientations. Phase flipping may also occur with respect to groups of antennas in a system, with respect to a single antenna and a group of antennas, or in any other configuration suitable to eliminate or move null zones within an interrogation zone. For example, the relative orientations between the antenna pairs 1002, 1004 and 1006, 1008 may change or flip between phase orientations. Groups of antennas may be provided in a variety of orientations, e.g. coaxial, parallel or perpendicular to each other, and may be configured in field canceling within one or more groups and phase flipping between one or more groups. Also, each antenna 1002, 1004, 1006, and/or 1008 may be configured as a group of antennas. Moreover, switching between phase orientations need not be periodic and may be established based on a random or known time basis.

There is thus provided an EAS or RFID system for providing a reduced magnetic field at a large distance. The magnetic field levels in the interrogation zone may be kept sufficiently high for marker detection while the magnetic field levels at distant locations outside the interrogation zone are sufficiently low to meet regulatory requirements and avoid false alarms. In addition, there is provided an EAS or RFID system with a phase flipping approach to reduce, eliminate, or move null zones to a more advantageous location.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An EAS or RFID system comprising:
a first core antenna system configured for establishing a first magnetic field having a first direction; and
a second core antenna system configured for establishing a second magnetic field having a second direction opposite from said first direction,
said first and second magnetic fields at least partially canceling each other at a distance outside of a predetermined interrogation zone for detecting an EAS or RFID tag.

2. The system of claim 1, wherein said first core antenna system comprises a first core antenna of a first length and said second core antenna system comprises a second core antenna of a second length, wherein said first length and said second length are substantially equal.

3. The system of claim 1, wherein said first core antenna system and said second core antenna system are separated in a radial direction.

4. The system of claim 3, wherein said first core antenna system and said second core antenna system are separated in an axial direction.

5. The system of claim 1, wherein said first core antenna system and said second core antenna system are separated in an axial direction.

6. The system of claim 1, wherein at least one of said first and second core antenna systems comprises a plurality of core antennas.

7. The system of claim 1, wherein said first core antenna system comprises a first plurality of core antennas and said second core antenna system comprises a second plurality of core antennas.

8. The system of claim 7, wherein said first plurality of core antennas is positioned orthogonally to said second plurality of core antennas.

9. The system of claim 1, wherein said system comprises at least one controller configured to drive said first antenna system at a first drive level and said second antenna system at a second drive level, wherein said first drive level is different than said second drive level.

10. The system of claim 9, wherein said first core antenna system comprises a first core antenna and said second core antenna system comprises a plurality of core antennas each having a second length, wherein said first length and said second length are substantially equal.

11. The system of claim 10, wherein said first drive level is greater than said second drive level.

12. The system of claim 9, wherein said wherein said first core antenna system comprises a first core antenna of a first length and said second core antenna system comprises a second core antenna of a second length, wherein said first length is different from said second length.

13. The system of claim 12, wherein said first length is shorter than said second length and wherein said first drive level is greater than said second drive level.

14. An EAS or RFID system comprising:
a controller configured for providing a first excitation signal during a first time interval and a second excitation signal during a second time interval; and
at least one core antenna system responsive to said first excitation signal to produce a first magnetic field in a first direction during said first time interval and responsive to said second excitation signal to produce a second magnetic field in a second direction opposite from said first direction during said second time interval.

15. The system of claim 14, wherein said controller is configured to periodically provide said first and second excitation signals.

16. An EAS or RFID system comprising:
at least one controller for providing excitation signals associated with each of first and a second time interval; and
a first core antenna system configured to produce a first magnetic field in a first direction during said first time interval and to produce a second magnetic field having in a second direction during said second time interval, said second direction being substantially opposite said first direction;
a second core antenna system configured to produce a third magnetic field in a third direction during said first time interval and to produce a fourth magnetic field in a fourth direction during said second time interval, said fourth direction being substantially opposite said third direction.

17. The system of claim 16, wherein said controller is configured to periodically provide said excitation signals.

18. The system of claim 16, wherein said first direction is opposite said third direction and said second direction is opposite said fourth direction.

19. The system of claim 18, wherein said first and third magnetic fields at least partially cancel each other at a distance outside of a predetermined interrogation zone, and said second and fourth magnetic fields at least partially cancel each other at said distance outside of said predetermined interrogation zone.

20. The system of claim 16, said system further comprising a third antenna system positioned orthogonally to at least one of said first and second core antenna systems.

21. The system of claim 20, wherein said third antenna system is disposed between said first and second core antenna systems.

22. The system of claim 21, said system further comprising a fourth antenna system positioned orthogonally to at least one said first and second core antenna systems.

23. The system of claim 22, wherein said fourth antenna system is disposed between said first and second core antenna systems.

24. The system of claim 16, wherein said system comprises third and fourth antenna systems positioned orthogonally to said first and second core antenna systems and disposed between said first and second core antenna systems, and wherein said third antenna system is configured to produce a fifth magnetic field in a fifth direction during said first time interval, and wherein said fourth antenna system is configured to produce a sixth magnetic field in a sixth direction during said first time interval, said fifth direction being opposite from said sixth direction.

25. The system of claim 16, wherein at least one of said first and second core antenna systems comprises a plurality of associated antennas.

26. A method of establishing an interrogation zone in an EAS or RFID system with reduced magnetic field strength outside of the interrogation zone, said method comprising:
exciting a first core antenna system to provide a first magnetic field in a first direction; and
exciting a second core antenna system to provide a second magnetic field in a second direction whereby at a position outside of the interrogation zone said first magnetic field and said second magnetic field at least partially cancel.

27. The method of claim 26, wherein said first core antenna system comprises a first core antenna of a first length and said second core antenna system comprises a second core antenna of a second length, said first length and said second length being substantially equal.

28. The method of claim 27, wherein said first core antenna is excited at a first drive level and said second antenna is excited at a second drive level different from said first drive level.

29. A method of establishing an interrogation zone in an EAS or RFID system, said method comprising:
exciting a first core antenna system to provide a first magnetic field in a first direction during a first time interval; and
exciting said first core antenna system to provide a second magnetic field in a second direction during a second time interval, wherein said second direction is substantially opposite said first direction.

30. The method of claim 29 said method further comprising,
exciting a second core antenna system to provide a third magnetic field in a third direction during said first time interval and to provide a fourth magnetic field in a fourth direction during said second time interval, wherein said fourth direction is substantially opposite said third direction.

31. The method of claim 30, wherein said first direction is substantially opposite said third direction and said second direction is substantially opposite said fourth direction.

32. The system of claim 31, wherein said first and third magnetic fields at least partially cancel each other at a distance outside of said interrogation zone, and said second and fourth magnetic fields at least partially cancel each other at said distance outside of said interrogation zone.

33. The method of claim 30, said method further comprising:
providing third and fourth antenna systems positioned orthogonally to said first and second core antenna systems and disposed between said first and second antenna core antenna systems;
exciting said third antenna system to produce a fifth magnetic field in a fifth direction during said first time interval; and
exciting said fourth antenna system to produce a sixth magnetic field in a sixth direction during said first time interval, said fifth direction being opposite from said sixth direction.

34. The method of claim 30 wherein at least one of said first and second core antenna systems comprises a plurality of associated antennas.

* * * * *